United States Patent [19]
Garber

[11] Patent Number: 5,610,446
[45] Date of Patent: Mar. 11, 1997

[54] DUAL FUNCTION THEFT PREVENTION SYSTEM

[76] Inventor: Barry Garber, 1548 Nelmore Blvd., Gilbertsville, Pa. 19525

[21] Appl. No.: 577,114

[22] Filed: Dec. 22, 1995

[51] Int. Cl.$^6$ ..................................................... B60R 25/04
[52] U.S. Cl. ...................... 307/10.5; 180/287; 340/425.5
[58] Field of Search .................................. 307/9.1–10.6; 180/287; 340/425.5, 426, 825.3–825.32, 825.69, 825.72, 542; 364/424.01–424.05; 235/380, 382, 382.5, 487, 493

[56] References Cited

U.S. PATENT DOCUMENTS

| | | | |
|---|---|---|---|
| 5,086,868 | 2/1992 | Fontaine et al. | 180/287 |
| 5,289,369 | 2/1994 | Hirshberg | 340/825.31 |
| 5,343,077 | 8/1994 | Yoshida et al. | 180/287 |
| 5,412,378 | 5/1995 | Clemens | 340/825.31 |
| 5,473,200 | 12/1995 | Woo | 307/10.2 |
| 5,499,181 | 3/1996 | Smith | 364/424.04 |
| 5,513,107 | 4/1996 | Gormley | 180/287 |
| 5,519,260 | 5/1996 | Washington | 307/10.5 |

*Primary Examiner*—Richard T. Elms

[57] ABSTRACT

A dual function theft prevention system including a plurality of numeric keys allowing a driver to enter a multiple digit numeric code and a magnetic strip reader for receiving and scanning an associated card with a code sequence present thereon. Also included is an ignition for actuating a conventional vehicle engine upon receipt of power and brake circuitry connected to a conventional anti-lock brake system module for engaging brakes of the vehicle upon the activation thereof and further allowing normal operation of the anti-lock brake system module upon the deactivation thereof. Finally, control circuitry is coupled to the numeric keys, magnetic strip reader, brake circuitry, and ignition. The control circuitry is adapted to provide power to the ignition and deactivate the brake circuitry upon receiving a proper multiple digit numeric code sequence via the numeric keys and subsequently receiving a proper code sequence from the magnetic strip reader.

1 Claim, 3 Drawing Sheets

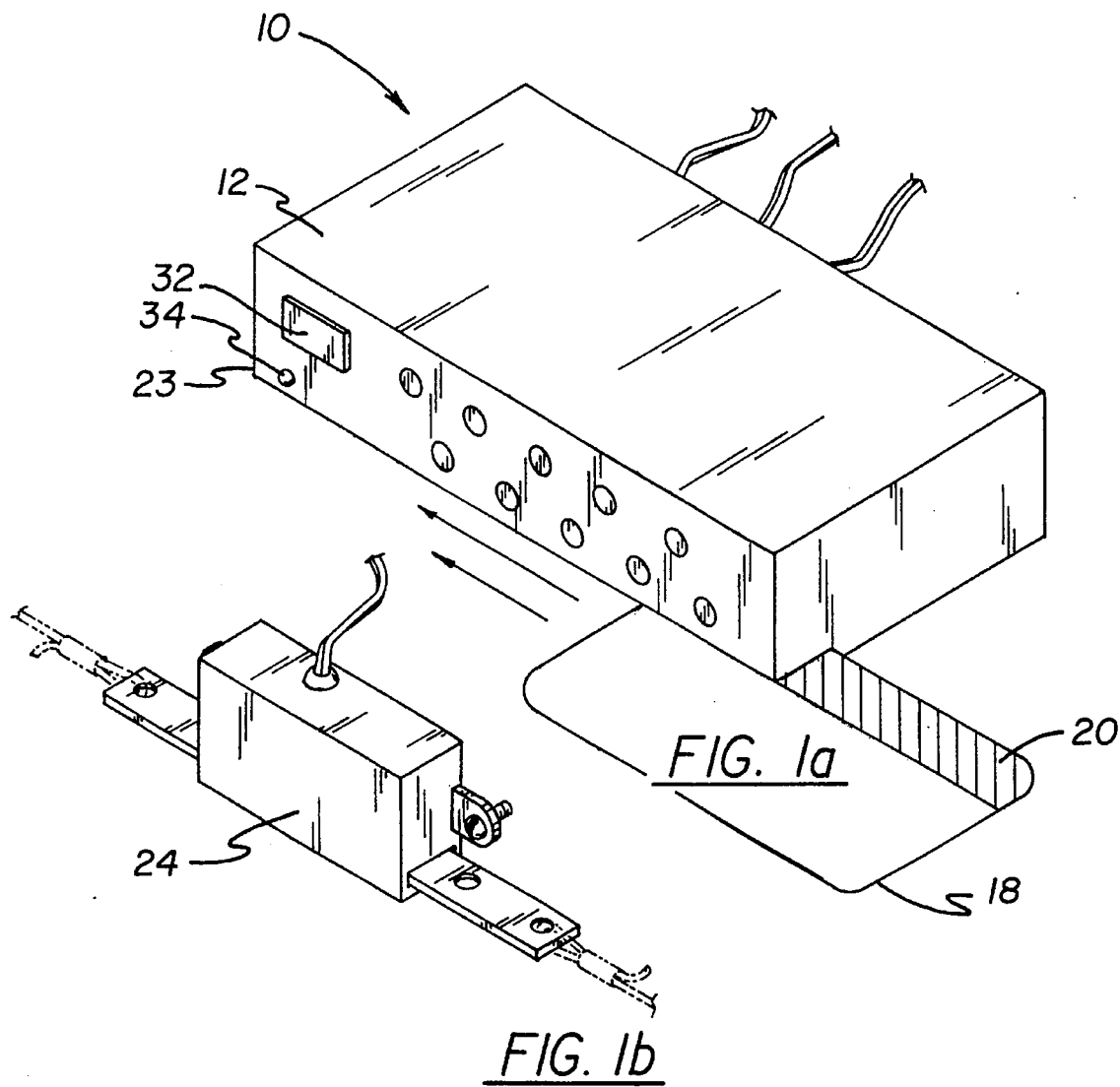
FIG. 1a
FIG. 1b
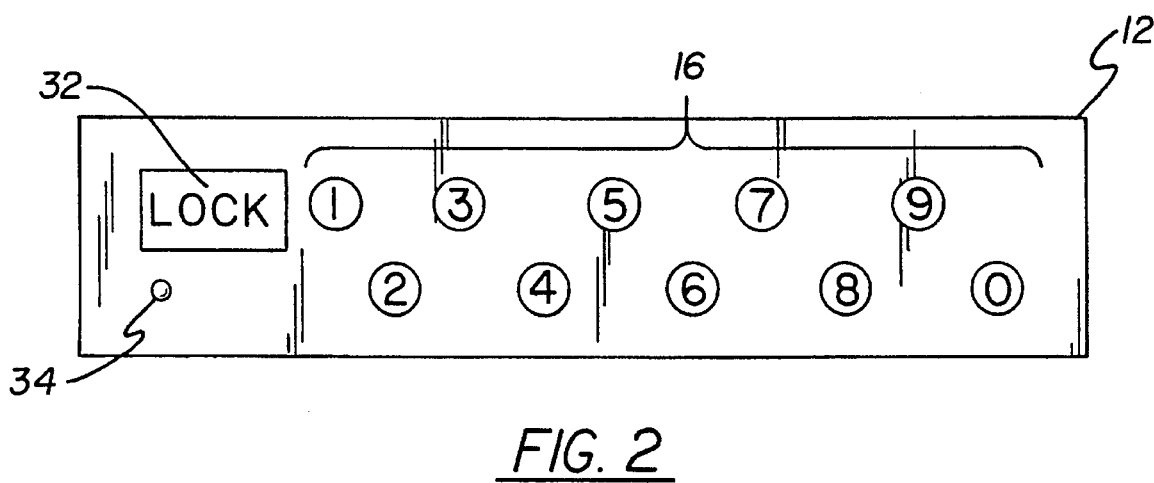
FIG. 2

DUAL FUNCTION THEFT PREVENTION SYSTEM

BACKGROUND OF THE INVENTION

1. Field of the Invention

The present invention relates to a dual function theft prevention system and more particularly pertains to preventing both conventional methods of theft and unauthorized towing of a vehicle.

2. Description of the Prior Art

The use of theft prevention systems is known in the prior art. More specifically, theft prevention systems heretofore devised and utilized for the purpose of preventing theft of a vehicle are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,736,113 to Leu a button-type code switch controller which can turn on and off the car switches with a signal sent by the code operating circuit and control circuit formed by such electronic elements as a transistor-transistor logic. U.S. Pat. No. 5,304,979 to Lima et al. discloses a vehicle ant-theft system which is operable in response to setting a lockout circuit to prevent the car from being started if a hidden switch is not activated. U.S. Pat. No. 5,193,641 to Durrell discloses an anti-theft system which cuts off the fuel supply to the engine if certain timing sequences are not followed upon starting the vehicle. U.S. Pat. No. 5,335,748 to Wilson; U.S. Pat. No. 3,755,777 to Lee; and U.S. Pat. No. 5,041,810 to Gotanda are provided as being of general interest.

In this respect, the dual function theft prevention system according to the present invention substantially departs from the conventional concepts and designs of the prior art, and in so doing provides an apparatus primarily developed for the purpose of preventing both conventional methods of theft and unauthorized towing of a vehicle.

Therefore, it can be appreciated that there exists a continuing need for a new and improved dual function theft prevention system which can be used for preventing both conventional methods of theft and unauthorized towing of a vehicle. In this regard, the present invention substantially fulfills this need.

SUMMARY OF THE INVENTION

In view of the foregoing disadvantages inherent in the known types of theft prevention systems now present in the prior art, the present invention provides an improved dual function theft prevention system. As such, the general purpose of the present invention, which will be described subsequently in greater detail, is to provide a new and improved dual function theft prevention system apparatus and method which has all the advantages of the prior art and none of the disadvantages.

To attain this, the present invention essentially comprises a plurality of numeric keys situated on the front face of the housing. The keys are adapted to allow a driver to enter a four digit numeric code sequence. Also included is a card comprising a magnetic strip containing a card code sequence. A magnetic strip reader is formed on the front face of the housing with a pair of open ends positioned on each of the side walls for receiving the card and allowing it to be slid therethrough. The magnetic strip reader is further adapted to scan the card code sequence present on the magnetic strip. An ignition is included for actuating a conventional vehicle engine upon the receipt of power. Brake circuitry is connected to a conventional anti-lock brake system module for engaging brakes of the vehicle upon the activation thereof. The brake circuitry further allows normal operation of the brake system module upon the deactivation thereof. Also included is a lock key having an activated orientation upon the depression thereof. Finally, control circuitry is coupled to the power source, numeric keys, magnetic strip reader, ignition, and brake circuitry. The control circuitry is adapted to provide power to the ignition and deactivate the brake circuitry upon receiving a proper four digit numeric code sequence from the numeric keys and subsequently receiving a proper card code sequence from the magnetic strip reader. The control circuitry is further adapted to preclude power from being supplied to the ignition and further activate the brake circuitry upon the activation of the lock key.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dual function theft prevention system which has all the advantages of the prior art theft prevention systems and none of the disadvantages.

It is another object of the present invention to provide a new and improved dual function theft prevention system which may be easily and efficiently manufactured and marketed.

It is a further object of the present invention to provide a new and improved dual function theft prevention system which is of a durable and reliable construction.

An even further object of the present invention is to provide a new and improved dual function theft prevention system which is susceptible of a low cost of manufacture with regard to both materials and labor, and which accordingly is then susceptible of low prices of sale to the consuming public, thereby making such dual function theft prevention system economically available to the buying public.

Still yet another object of the present invention is to provide a new and improved dual function theft prevention system which provides in the apparatuses and methods of the prior art some of the advantages thereof, while simultaneously overcoming some of the disadvantages normally associated therewith.

Still another object of the present invention is to prevent both conventional methods of theft and unauthorized towing of a vehicle.

Lastly, it is an object of the present invention to provide a dual function theft prevention system including a plurality of numeric keys allowing a driver to enter a multiple digit numeric code and a magnetic strip reader for receiving and scanning an associated card with a code sequence present thereon. Also included is an ignition for actuating a conventional vehicle engine upon receipt of power and brake circuitry connected to a conventional anti-lock brake system module for engaging brakes of the vehicle upon the activation thereof and further allowing normal operation of the anti-lock brake system module upon the deactivation thereof. Finally, control circuitry is coupled to the numeric keys, magnetic strip reader, brake circuitry, and ignition. The control circuitry is adapted to provide power to the ignition and deactivate the brake circuitry upon receiving a proper multiple digit numeric code sequence via the numeric keys and subsequently receiving a proper code sequence from the magnetic strip reader.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1a is a perspective illustration of the preferred embodiment of the dual function theft prevention system constructed in accordance with the principles of the present invention.

FIG. 1b is a perspective view of the housing of the present invention depicting the rear face thereof.

FIG. 2 is a perspective view of the ignition employed in the present invention.

Similar reference characters refer to similar parts throughout the several views of the drawings.

DESCRIPTION OF THE PREFERRED EMBODIMENT

Figure 3A:
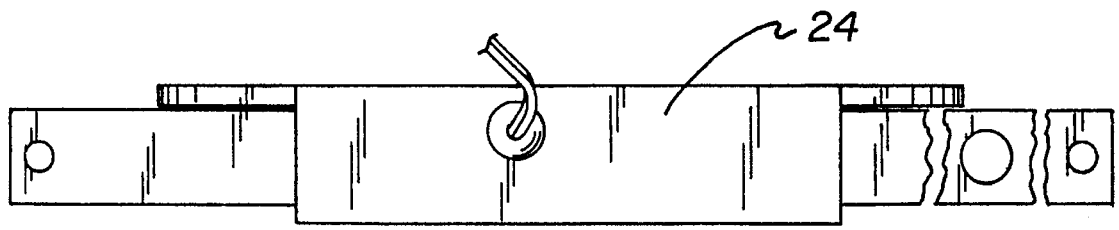
FIG. 3a is a view of a rear face of the ignition switch employed in present invention.
Figure 3B:
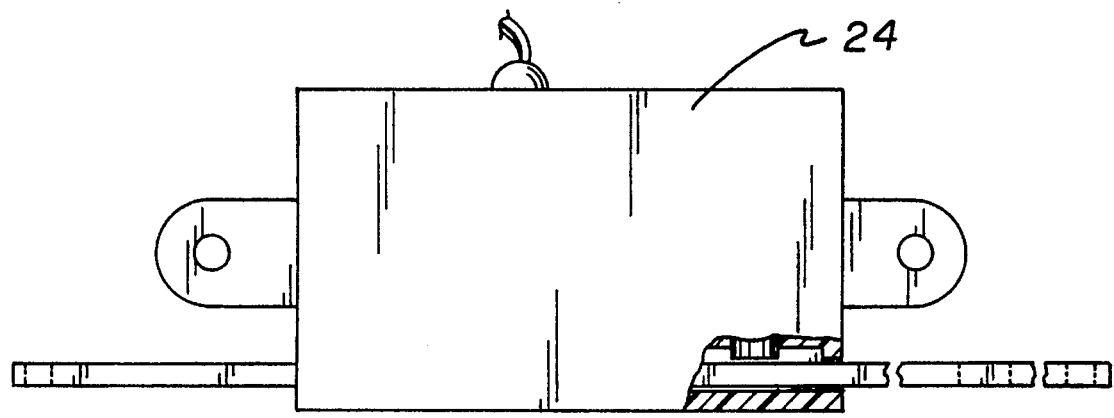
FIG. 3b is a view of a top wall of the ignition switch of the present invention.
Figure 4A:
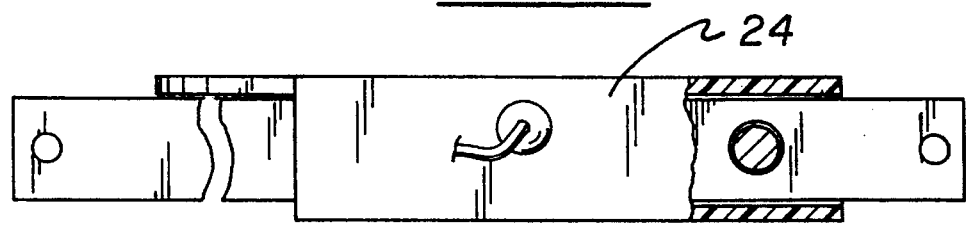
FIG. 4a is a view of a rear face of the ignition switch employed in present invention.
Figure 4B:
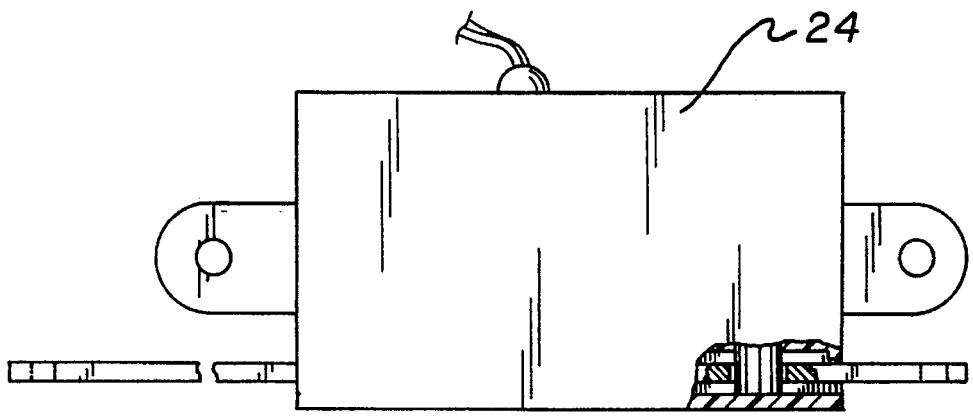
FIG. 4b is a view of a top wall of the ignition switch of the present invention.
Figure 5:
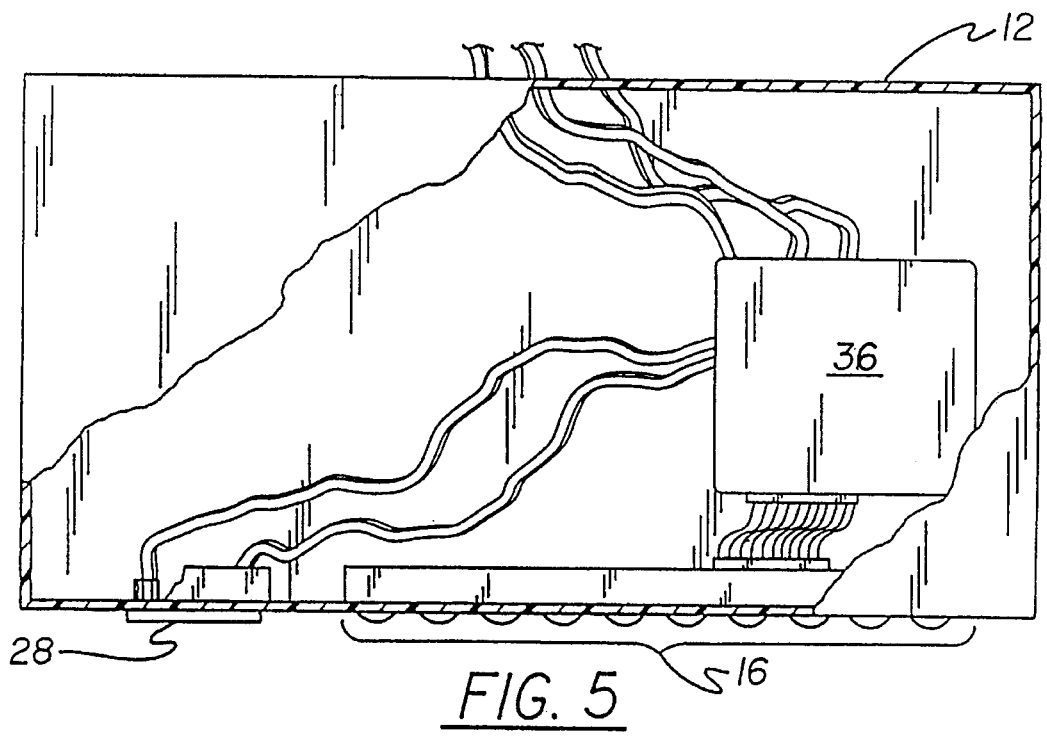
FIG. 5 is a top plan cut-away view of the present invention.

With reference now to the drawings, and in particular to FIGS. 1a, 1b, 3a, 3b, 4a, 4b, and 5 thereof, a new and improved dual function theft prevention system embodying the principles and concepts of the present invention and generally designated by the reference numeral 10 will be described.

The present invention, the new and improved dual function theft prevention system, is comprised of a plurality of components. Such components in their broadest context include a housing, numeric keys, card, magnetic strip reader, ignition, brake circuitry, and control circuitry. Such components are individually configured and correlated with respect to each other so as to attain the desired objective.

More specifically, it will be noted that the system 10 of the present invention comprises a rectangular housing 12 having a top wall, bottom wall, front face, rear face, and pair of side walls defining an interior space. The housing is adapted to be coupled to a conventional vehicle instrument panel. A power source is included comprising a conventional automobile battery 14 or the like.

Referring to FIG. 2, a plurality of numeric keys 16 are situated on the front face of the housing. The keys are adapted to allow a driver to enter a four digit numeric code sequence. The keys include numbers ranging from one to ten. The keys are ideally staggered as to allow ease in entering the code sequence.

Also included is a card 18 comprising a magnetic strip 20 containing a card code sequence. Such card resembles a typical credit card or automatic teller machine card. The magnetic strip and associated card code sequence may also be incorporated with a driver license.

A magnetic strip reader 22 comprises a slot 23 horizontally formed on the front face of the housing with a pair of open ends positioned on each of the side walls for receiving the card and allowing it to be slid therethrough. The magnetic strip reader is adapted to scan the card code sequence present on the magnetic strip.

Figure 6:
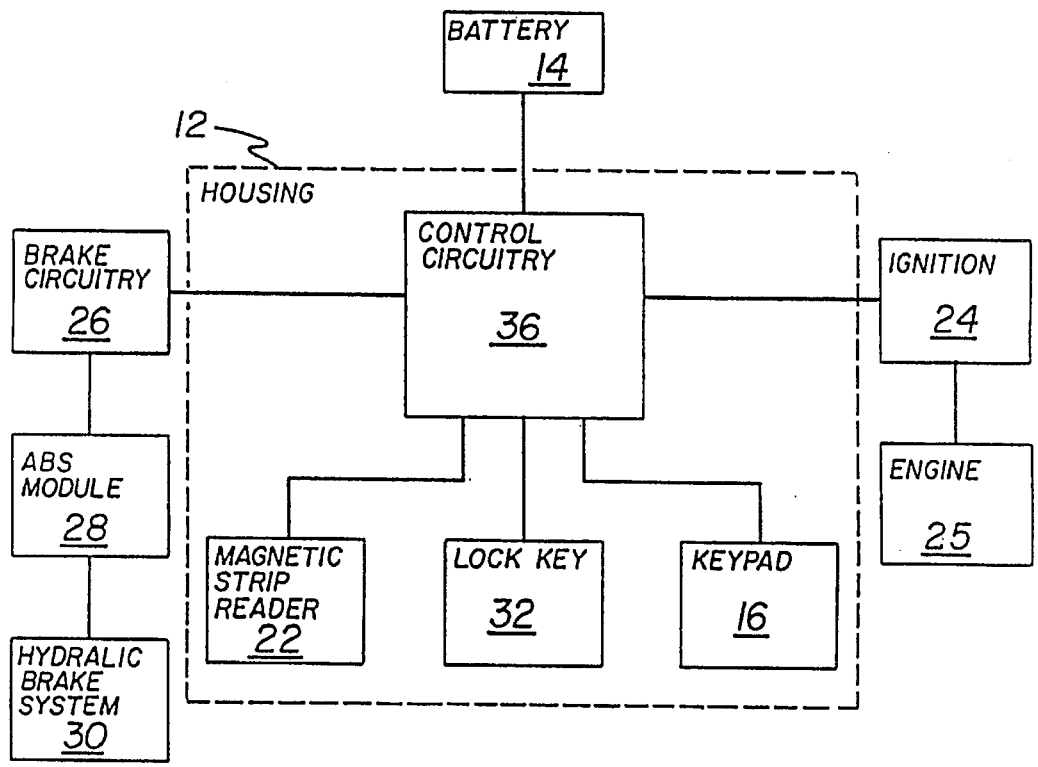
FIG. 6 is a schematic depicting the circuitry employed in the present invention.

Referring to FIG. 6, an ignition 24 is included for actuating a conventional vehicle engine 25 upon the receipt of power from the power source.

Brake circuitry 26 is connected to a conventional anti-lock brake system module for engaging brakes of the vehicle upon the activation thereof. Upon being activated, the brake circuitry utilizes the ABS module 28 which is normally used for precluding the activation of the hydraulic brake system 30 of a vehicle. In an activated state, the brake circuitry employs the ABS module as a braking mechanism. The brake circuitry further allows normal operation of the brake system module upon the deactivation thereof.

A lock key 32 is situated on the front face of the housing. The lock key has an activated orientation upon the depression thereof. Also included is a light emitting diode 34 for signalling when the lock key is in an activated orientation.

Finally, control circuitry 36 is situated within the interior space of the housing and coupled to the power source, numeric keys, magnetic strip reader, ignition, and brake circuitry. As shown in FIG. 6, the control circuitry is also connected to the lock key. The control circuitry is adapted to provide power to the ignition and deactivate the brake circuitry upon receiving a proper four digit numeric code sequence from the numeric keys and subsequently receiving a proper card code sequence from the magnetic strip reader. The control circuitry is further adapted to preclude power from being supplied to the ignition and further activate the brake circuitry upon the activation of the lock key.

Operation and use of the present invention is facilitated by the amalgamation of the foregoing components. Before use, the present invention precludes power from being supplied to the ignition and further activates the brakes. Upon entering a car, a driver must enter a four digit code sequence via the numeric keys and, within a predetermined amount of time, swipe the card through the magnetic strip reader. Only if both the numeric code sequence and card code sequence are correct, the device provides power to the ignition and deactivates the brake circuitry thus allowing normal operation of the vehicle. After use, the lock key is depressed thereby precluding power from being supplied to the ignition and further activating the brake circuitry thus making the vehicle undriveable.

The dual function theft prevention system provides an unsurpassed method of protecting a vehicle from theft. Through the unique manipulation of both the ignition and braking system, the present invention not only prevents conventional methods of theft in which the vehicle is illegally driven but also precludes the vehicle from being towed by an unauthorized party. In addition, the present invention prevents an inebriated driver from operating the vehicle. Due to the coordination required to undergo the unique dual method of unlocking the system, it would be unlikely for an inebriated user to be able to start the vehicle. Such a feature thus prevents accidents related to drunk driving.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed as being new and desired to be protected by LETTERS PATENT of the United States is as follows:

1. A dual function theft prevention system comprising, in combination:

a rectangular housing having a top wall, a bottom wall, a front face, a rear face, and a pair of side walls defining an interior space, the housing adapted to be coupled to a conventional vehicle instrument panel;

a power source comprising a conventional automobile battery;

a plurality of numeric keys situated on the front face of the housing for allowing a driver to enter a four digit numeric code sequence, wherein the keys are staggered so as to allow ease in entering the code sequence;

a card comprising a magnetic strip with a card code sequence present thereon;

a magnetic strip reader comprising a slot horizontally formed on the front face of the housing with a pair of open ends positioned on each of the side walls for receiving the card and further allowing the card to be slid laterally between the open ends, the magnetic strip reader for scanning the code sequence present on the magnetic strip;

an ignition for actuating a conventional vehicle engine upon the receipt of power from the power source;

brake circuitry connected to a conventional anti-lock brake system module for engaging brakes of the vehicle upon the activation thereof and further allowing normal operation of the brake system module upon the deactivation thereof;

a lock key situated on the front face of the housing, the lock key having an activated orientation upon the depression thereof, the lock key including a light emitting diode for signalling when the lock key is in an activated orientation; and control circuitry situated within the interior space of the housing and coupled to the power source, the numeric keys, the magnetic strip reader, the ignition, the lock key and the brake circuitry, the control circuitry for transmitting power to the ignition and deactivating the brake circuitry upon receipt of a proper four digit numeric code sequence from the numeric keys and further a proper card code sequence from the magnetic strip reader within a predetermined time period, the control circuitry further precluding power from being supplied to the ignition and further activate the brake circuitry upon the activation of the lock key.

* * * * *